D. BUSHOR.
Sulky.

No. 207,711. Patented Sept. 3, 1878.

Witnesses
Harry King
M. Church

Inventor
Dennis Bushor
By Hill & Ellsworth
His Atty

UNITED STATES PATENT OFFICE.

DENNIS BUSHOR, OF EFFINGHAM, ILLINOIS.

IMPROVEMENT IN SULKIES.

Specification forming part of Letters Patent No. 207,711, dated September 3, 1878; application filed January 11, 1878.

*To all whom it may concern:*

Be it known that I, DENNIS BUSHOR, of Effingham, in the county of Effingham and State of Illinois, have invented certain new and useful Improvements in Sulkies; and I do hereby declare the following to be a full and exact description of the same, reference being had to the accompanying drawings, forming part of this specification, in which—

Figure 1:
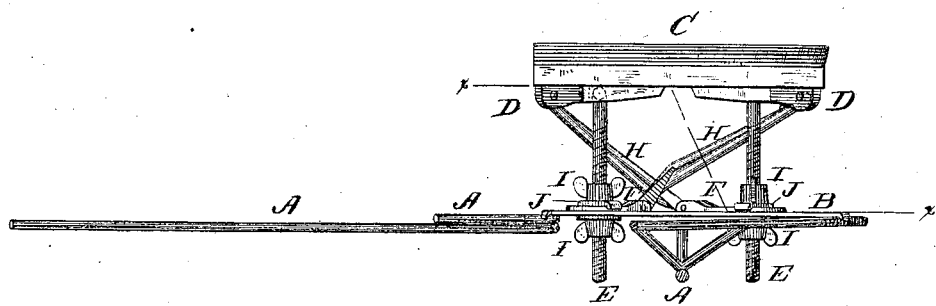
Figure 2:
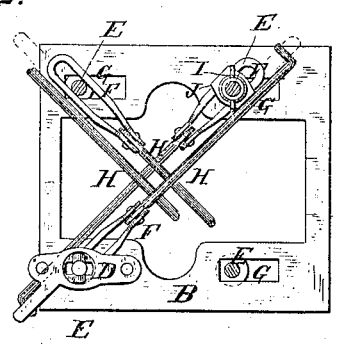

Figure 1 is a side elevation of a sulky-seat applied to the running-gear; and Fig. 2 is a horizontal section through the line $x\,x$, Fig. 1.

Similar letters of reference in the accompanying drawings denote the same parts.

My invention has for its object to provide a sulky or other two-wheeled carriage with a driver's seat which can be adjusted to accommodate the height of the driver with respect to the carriage and the size of the horse, and to throw his weight more or less upon the horse, as occasion may require.

To this end the invention consists, first, in adapting the seat for vertical and lateral adjustment and for leveling or inclining it to suit the driver, either with respect to the size of the horse, the driver's position upon the carriage, or his position upon the seat, to facilitate handling the horse with the best results; secondly, in the special means by which these various results are produced, as I will now proceed to describe.

In the accompanying drawings, A A represent the thills, braces, springs, and axle of a sulky, upon which is mounted an open plate or frame, B, to support the seat C. On the under side of the seat, at or near the four corners, are secured cast-metal sockets D D which receive the T-heads of four long screws, E E, passing vertically down through four links or slotted plates, F F, and thence through slots G G in the plate B, at or near the corners thereof. The outer corners of the metal sockets are made with ears, in which rods H H are pivoted so as to extend diagonally under the seat, crossing each other, and jointed to the inner ends of the links F F, as shown. I I are thumb-nuts on the screws, one set under the frame-plate B and the other set above bearing-plates J J, which rest upon the links so as to slide freely, such plates having flanges at the ends, fitting over the links, to prevent turning.

By adjusting the nuts upon the screws the seat can be raised or lowered to adjust its height and preserve its parallelism with the frame-plate B, or to incline it from front to rear, or from the rear to the front, or from one side to the other, or from one corner to the other, as the driver may wish or the exigencies for driving to the best advantage may require.

The seat is also adjusted laterally by the same means, and in all these various adjustments the links slide freely on the screws as the rods are more or less inclined or moved from side to side. In adjusting the seat forward or backward, which is done by the same means, the screws move through the slots in the frame-plate B, and unless the height, inclination, or lateral position of the seat is changed at the same time, the links do not slide upon the screws, as will be readily understood.

Having thus described my invention, what I claim as new is—

1. A sulky-seat adapted for adjustment to an inclined position, front or rear, upon the running-gear or frame of the sulky by means substantially as described, for the purpose specified.

2. A sulky-seat having its corners adapted for independent adjustment upon the running-gear or frame of the sulky by means substantially as described, for the purpose specified.

3. A sulky-seat adapted for vertical and lateral adjustment, a forward and backward adjustment, an inclined adjustment, and an adjustment at the corners upon the running-gear or frame of the sulky by means substantially as described, for the purposes specified.

4. The combination, with the seat and running-gear of a sulky, of the slotted plate B, pivoted adjusting-screws E E, pivoted rods H, and links F F, substantially as described, for the purposes specified.

5. The combination of the metal sockets D D with the seat, the adjusting-screws E E, and the rods H H, substantially as described, for the purpose specified.

DENNIS BUSHOR.

Witnesses:
H. C. BRUMBACK,
H. D. CALDWELL.